(12) United States Patent
Manning (10) Patent No.: US 11,575,986 B2
(45) Date of Patent: Feb. 7, 2023

(54) WEARABLE APPARATUS WITH UNIVERSAL WIRELESS CONTROLLER AND MONITORING TECHNOLOGY COMPRISING PANDEMIC DETECTION FEATURE

(71) Applicant: Lloyd Douglas Manning, Banner Elk, NC (US)

(72) Inventor: Lloyd Douglas Manning, Banner Elk, NC (US)

( * ) Notice: Subject to any disclaimer, the term of this patent is extended or adjusted under 35 U.S.C. 154(b) by 0 days.

(21) Appl. No.: 17/080,830

(22) Filed: Oct. 26, 2020

(65) Prior Publication Data

US 2021/0058697 A1 Feb. 25, 2021

Related U.S. Application Data

(63) Continuation of application No. 16/105,881, filed on Aug. 20, 2018, now Pat. No. 10,820,089, which is a
(Continued)

(51) Int. Cl.
| | |
|---|---|
| *H04R 1/10* | (2006.01) |
| *A63C 17/12* | (2006.01) |
| *G06F 1/16* | (2006.01) |
| *G06F 3/01* | (2006.01) |
| *G06F 16/583* | (2019.01) |
| *G06V 10/25* | (2022.01) |

(Continued)

(52) U.S. Cl.
CPC .......... *H04R 1/1091* (2013.01); *A63C 17/12* (2013.01); *G06F 1/163* (2013.01); *G06F 3/014* (2013.01); *G06F 16/5838* (2019.01); *G06V 10/25* (2022.01); *G06V 20/20* (2022.01); *G08B 3/10* (2013.01); *G08C 17/02* (2013.01); *H04Q 9/00* (2013.01); *H04R 1/021* (2013.01); *H04R 3/00* (2013.01); *A63C 17/01* (2013.01); *A63C 2203/18* (2013.01); *A63C 2203/22* (2013.01); *B63B 32/10* (2020.02); *G08C 2201/93* (2013.01); *H04Q 2209/40* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 2015/0220786 A1* | 8/2015 | Fol ........................ | G06K 9/6253 382/181 |
| 2016/0235374 A1* | 8/2016 | Miller ..................... | G06F 1/163 |

(Continued)

*Primary Examiner* — Qin Zhu
(74) *Attorney, Agent, or Firm* — William Simmons; Simmons Patents (57) ABSTRACT

Disclosed is a wearable apparatus configured for monitoring a user's environment and items in a user's environment. The wearable apparatus comprises a plurality of communication circuits configured to communicate using a plurality of communication protocols. The wearable device is configured to use sensors to automatically detect organisms in a user's environment and issue and warnings related to a detected organism. The wearable device is configured to communicate with a plurality of health sensors that may be separate modules using a plurality of communication protocols and combine the health reading into user health status data. The user status data may be transmitted along with verification tags to remote devices.

12 Claims, 5 Drawing Sheets

Related U.S. Application Data continuation-in-part of application No. 15/470,861, filed on Mar. 27, 2017, now Pat. No. 10,057,676.

(51) Int. Cl.

| | | |
|---|---|---|
| *G06V 20/20* | (2022.01) | |
| *G08B 3/10* | (2006.01) | |
| *G08C 17/02* | (2006.01) | |
| *H04Q 9/00* | (2006.01) | |
| *H04R 1/02* | (2006.01) | |
| *H04R 3/00* | (2006.01) | |
| *A63C 17/01* | (2006.01) | |
| *B63B 32/10* | (2020.01) | |

(56) References Cited

U.S. PATENT DOCUMENTS

| | | | |
|---|---|---|---|
| 2017/0011210 A1* | 1/2017 | Cheong | H04W 4/00 |
| 2017/0123487 A1* | 5/2017 | Hazra | G06F 3/0346 |
| 2017/0140662 A1* | 5/2017 | Carr-Jordan | G06F 1/1637 |
| 2018/0011932 A1* | 1/2018 | Gerst | H04L 69/40 |
| 2018/0046872 A1* | 2/2018 | Diamond | G06K 9/00369 |
| 2018/0053200 A1* | 2/2018 | Cronin | G06Q 30/0239 |
| 2018/0103901 A1* | 4/2018 | Gandhi | A61B 5/14551 |
| 2018/0114124 A1* | 4/2018 | Cronn | H04W 4/029 |
| 2018/0122219 A1* | 5/2018 | Catering | H04L 63/083 |
| 2019/0029584 A1* | 1/2019 | Carr-Jordan | G06F 3/04817 |
| 2020/0193162 A1* | 6/2020 | Birch | G06K 9/00671 |
| 2020/0279339 A1* | 9/2020 | Akutagawa | G06Q 10/1095 |
| 2021/0169417 A1* | 6/2021 | Burton | A61B 5/02055 |

* cited by examiner

WEARABLE APPARATUS WITH UNIVERSAL WIRELESS CONTROLLER AND MONITORING TECHNOLOGY COMPRISING PANDEMIC DETECTION FEATURE

CLAIM TO PRIORITY

This application is a continuation of application Ser. No. 16/105,881, filed on 20 Aug. 2018, which is a continuation in part to application Ser. No. 15/470,861 filed on 27 Mar. 2017 (now U.S. Pat. No. 10,057,676), which is a continuation in part to application Ser. No. 14/740,220 filed 15 Jun. 2015 (now U.S. Pat. No. 9,607,506), which is a continuation in part to Ser. No. 13/652,424 filed 15 Oct. 2012 (now U.S. Pat. No. 9,060,385), which is a continuation in part to Ser. No. 13/114,028, filed on 23 May 2011 (now U.S. Pat. No. 8,306,673) and application Ser. No. 12/106,323 filed 20 Apr. 2008 (U.S. Pat. No. 8,290,636) which claims priority to provisional application 60/912,940, filed on 20 Apr. 2007, whereas the entire contents of all such references are hereby incorporated herein by this reference for all that they disclose for all purposes.

TECHNICAL FIELD OF THE INVENTION

The present invention is an electronic wearable apparatus comprising universal controller and monitoring features. The system may monitor a user's environment and, by user command or automatically, provide selectable information about the user's environment allowing a user to better "decoded" his environment and provide notifications and warnings. The system may be configured to detect another organism in the user's environment exhibiting symptoms of an illness. The system may detect an item in the user's environment where such an item is electronically controllable, access a control program stored on a remote database, and configure the system to operate the item using the universal controller technology. The system may also be configured to communicate with a plurality of health sensors (e.g., weight, temperature, $O_2$, and blood glucose level) and feed the data to a health monitoring program or local or remote data storage or data mining device or system.

BACKGROUND OF THE INVENTION

The current invention relates to the latest improvements in a sequence of technologies presented in a line of Manning patents: (I) Manning U.S. Pat. No. 8,290,636 relates to a powered water riding apparatus with a wearable electronic controller; (II) Manning U.S. Pat. No. 8,306,673 relates to a wearable controller for controlling and operating powered riding machines such as land boards; (III) Manning U.S. Pat. No. 9,060,385 relates to a universal wireless controller associated with a user's hand for controlling a plurality of items; (IV) Manning U.S. Pat. No. 9,607,506 relates to a universal wireless controller for controlling a plurality of items without the need for reprogramming or hardwire changes; (V) Manning U.S. Pat. No. 10,057,675 relates to a wearable Enigma System configured to monitor a user's environment according to predefined programming and generate warnings and notifications related to the user's environment. (VI) Manning U.S. Pat. No. 10,820,089 relates to an improved Manning '675 Enigma wearable system with enhanced hand controller features. All such patents are incorporated by reference for all that they disclose for all purposes.

The current Manning technology relates to the enhanced system controller and monitoring features comprising embodiments that do not require hard-wired connections to a user's hands yet may be activated with predefined user movements such as hand or finger movements. The monitoring features are enhanced to monitor a user's environment for signs related to a pandemic or similar medical threats and automatically generate notifications and warnings.

The recent COVID-19 pandemic, hoax or real, has highlighted the unintended consequences of travel technologies' improvements. Today, travel between once challenging to reach places has become relatively easy, increasing the number of people traveling between such places. As a result, health issues, such as infectious diseases, previously contained within their geographic areas, can be more easily and quickly spread worldwide. Further, as a typical person goes through his daily routine, he encounters many items, electronic-based and otherwise, substances and environmental situations that may pose a risk. Further, it is not uncommon to encounter numerous people, known and unknown, perhaps from various backgrounds and associated languages and cultures. Information about one's environment and items and people in one's environment may prove very useful, indeed, lifesaving. For example, if a person is about to enter an area where there have been many people infected with an infectious disease, a person would want to know the safest route through such area and the steps required (countermeasures) to lower the risk of becoming infected. Further, a user would like to be notified if an organism in his detectable environment exhibits symptoms of an infectious disease or otherwise poses a health risk. What is needed is wearable technology that can access a local or remote database with information about a user's environment and use such information to monitor such an environment and identify items, situations, and/or people, places, and things of interest, and generate notifications and warnings related to the same.

Embodiments of the present invention address such concerns.

SUMMARY

Some of the objects and advantages of the invention will now be set forth in the following description, while other objects and advantages of the invention may be obvious from the description or may be learned through practice of the invention.

Broadly speaking, a principle object of the present invention is to provide a wearable apparatus with enhanced user controls where a user may control the wearable apparatus with hand and finger movements without a direct connection between the wearable apparatus and the hands and fingers.

Another objection of the present invention is to provide a wearable apparatus with enhanced user controls and configured to monitor a user's environment and generate notifications and warning about items in a user's environment.

Yet another object of the present invention is to provide a wearable apparatus configured to monitor a user's environment and generate notifications and warning about items in a user's environment, including people and animals exhibiting symptoms of a disease.

A still further object of the present invention is to provide a wearable apparatus configured to monitor a user's environment, generate an area warning for threats detected in a particular area and provide suggestions for the best path to navigate such an area and any precautions or countermeasures to consider.

Another object of the present invention is to provide a wearable universal apparatus that signals a user's health status to a remote device where such health status data is verifiable via an independent database.

Additional objects and advantages of the present invention are outlined in the detailed description herein or will be apparent to those skilled in the art upon reviewing the detailed description. It should also be further appreciated that modifications and variations to the specifically illustrated, referenced, and discussed steps, or features hereof may be practiced in various uses and embodiments of this invention without departing from the spirit and scope thereof by virtue of the present reference thereto. Such variations may include, but are not limited to, the substitution of equivalent steps, referenced or discussed, and the functional, operational, or positional reversal of various features, steps, parts, or the like. Further, it is to be understood that different embodiments, as well as different presently preferred embodiments, of this invention, may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. It will be apparent to those skilled in the art that various modifications and variations can be made in the present invention without departing from the invention's scope or spirit. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed or determined from the following detailed description.

Repeat use of reference characters is intended to represent the same or analogous features, elements, or steps. It is to be understood, by one of ordinary skill in the art, that the present discussion is a description of exemplary embodiments only and is not intended as limiting the broader aspects of the present invention.

Construction Aids

For this document, two or more items are "mechanically associated" by bringing them together or into a relationship with each other in any number of ways, including direct or indirect physical "releasable connections" (snaps, screws, Velcro®, bolts, etc.—generally connections designed to be easily and frequently released and reconnected), "hard-connections" (welds, rivets, macular bonds, generally connections that one does not anticipate disconnecting very often if at all and that are "broken" to separate), and/or "moveable connections" (rotating, pivoting, oscillating, etc.).

Similarly, two or more items are "electrically associated" by bringing them together or into a relationship with each other in any number of ways, including (a) a direct, indirect, or inductive communication connection and (b) a direct/indirect or inductive power connection. Additionally, while the drawings may illustrate various electronic components of a system connected by a single line, it will be appreciated that such lines may represent one or more signal paths, power paths, electrical connections and/or cables as required by the embodiment of interest.

The term "universal," as used with the terms "wearable apparatus" or "wireless monitor" in this document, means such a device is configured with a plurality of communication circuits that may communicate with a plurality of devices without the need for hardwire modifications and without the need for reprogramming the devices operating system or core program. Notably, such a universal controller may be reprogrammed, in a sense, by downloading applications ("apps") if desired to add and remove devices from the stable of controllable devices.

For the purposes of this document, unless otherwise stated, the phrase "at least one of A, B, and C" means there is at least one of A, or at least one of B, or at least one of C or any combination thereof (not one of A, and one of B, and one of C).

As used herein, the terms "first," "second," and "third" may be used interchangeably to distinguish one component from another and are not intended to signify the location or importance of the individual components.

The term "axial" refers to a direction parallel to the direction of rotation of an object; the term "radial" refers to a direction extending away from the center of an object or normal to the "axial" direction, and the term "circumferential" refers to a direction extending around the circumference or perimeter of an object.

As used in the claims, the definite article "said" identifies required elements that define the scope of embodiments of the claimed invention, whereas the definite article "the" merely identifies environmental elements that provide context for embodiments of the claimed invention that are not intended to be a limitation of any claim.

This document includes headers that are used for place markers only. Such headers are not meant to affect the construction of this document, do not in any way relate to the meaning of this document, nor should such headers be used for such purposes.

While the particulars of the present invention and associated technology may be adapted for use in any type of wearable device, the examples discussed herein are primarily in the context of a device associated with a user's body such as arm or wrist.

DESCRIPTION

Figure 1:
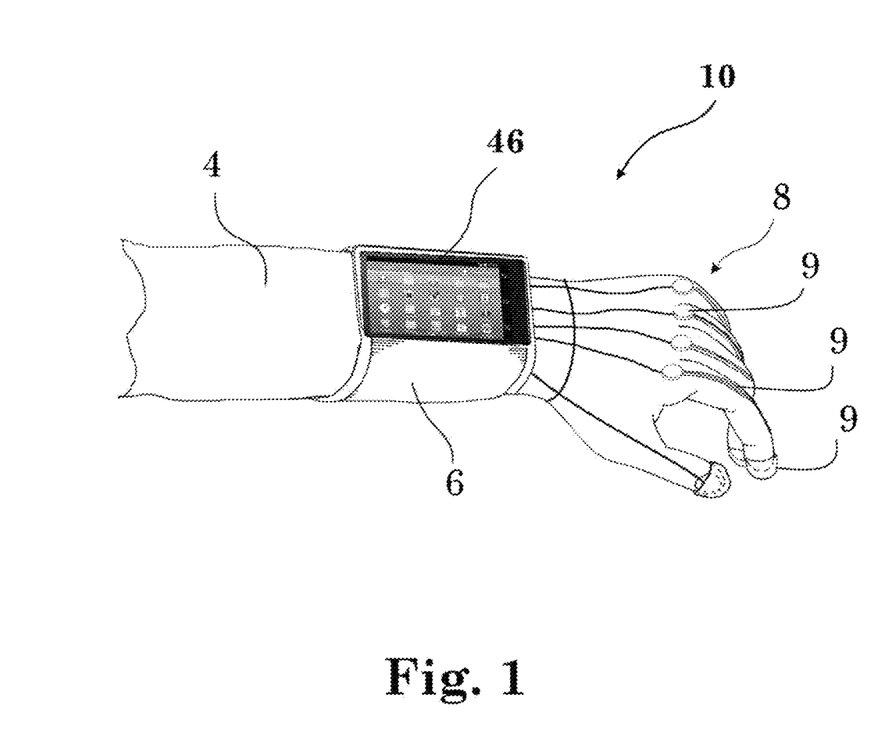
FIG. 1 is a top perspective view of one exemplary wearable apparatus with connected finger elements.
Figure 2:
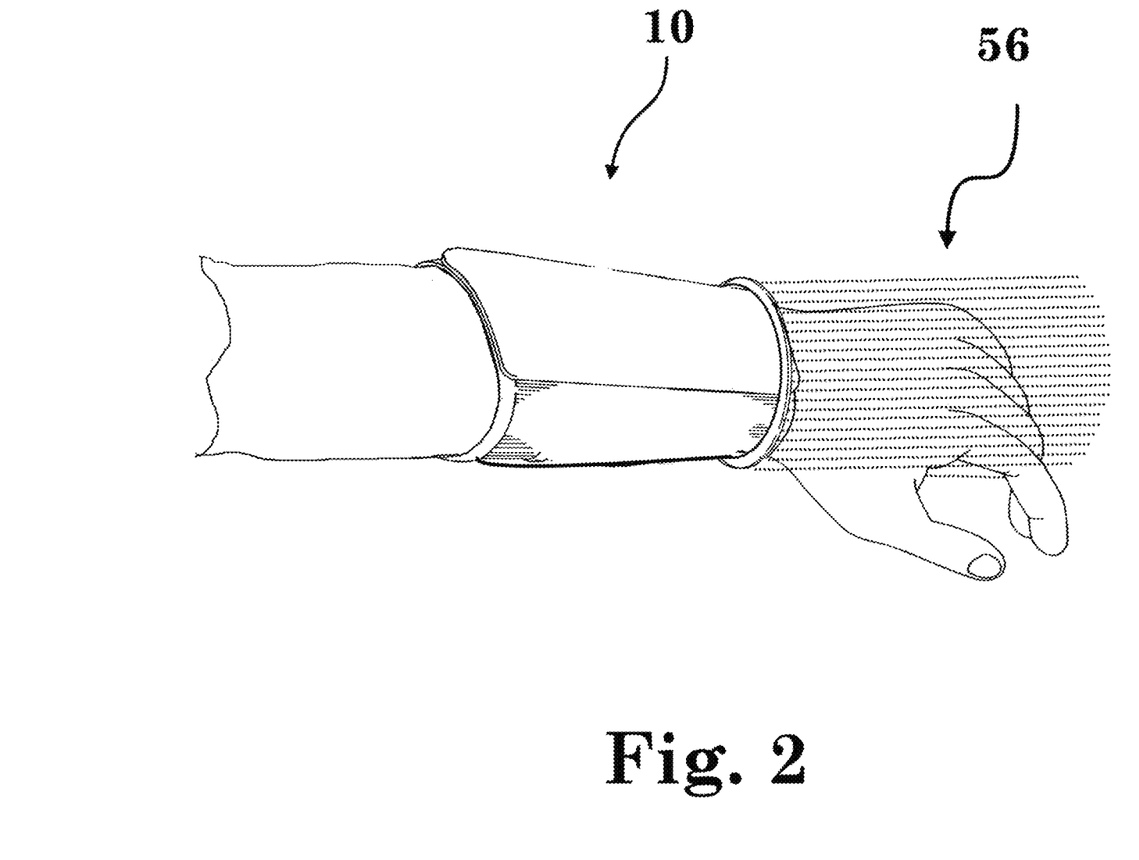
FIG. 2 is a top perspective view of one exemplary wearable apparatus with the connected finger elements replaced by laser-based motion detectors.
Figure 3:
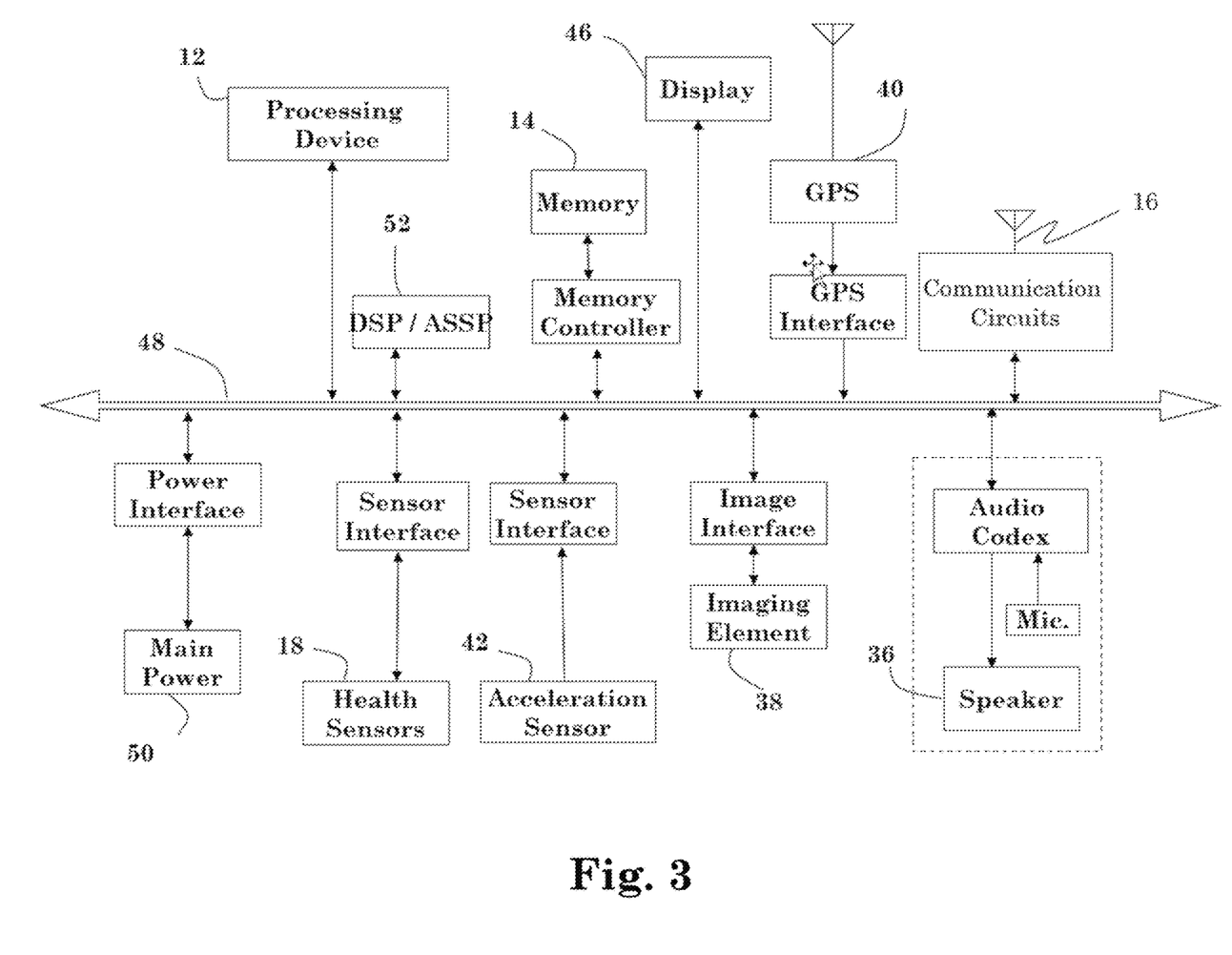
FIG. 3 is a block diagram schematic representation of a wearable apparatus.
Figure 4:
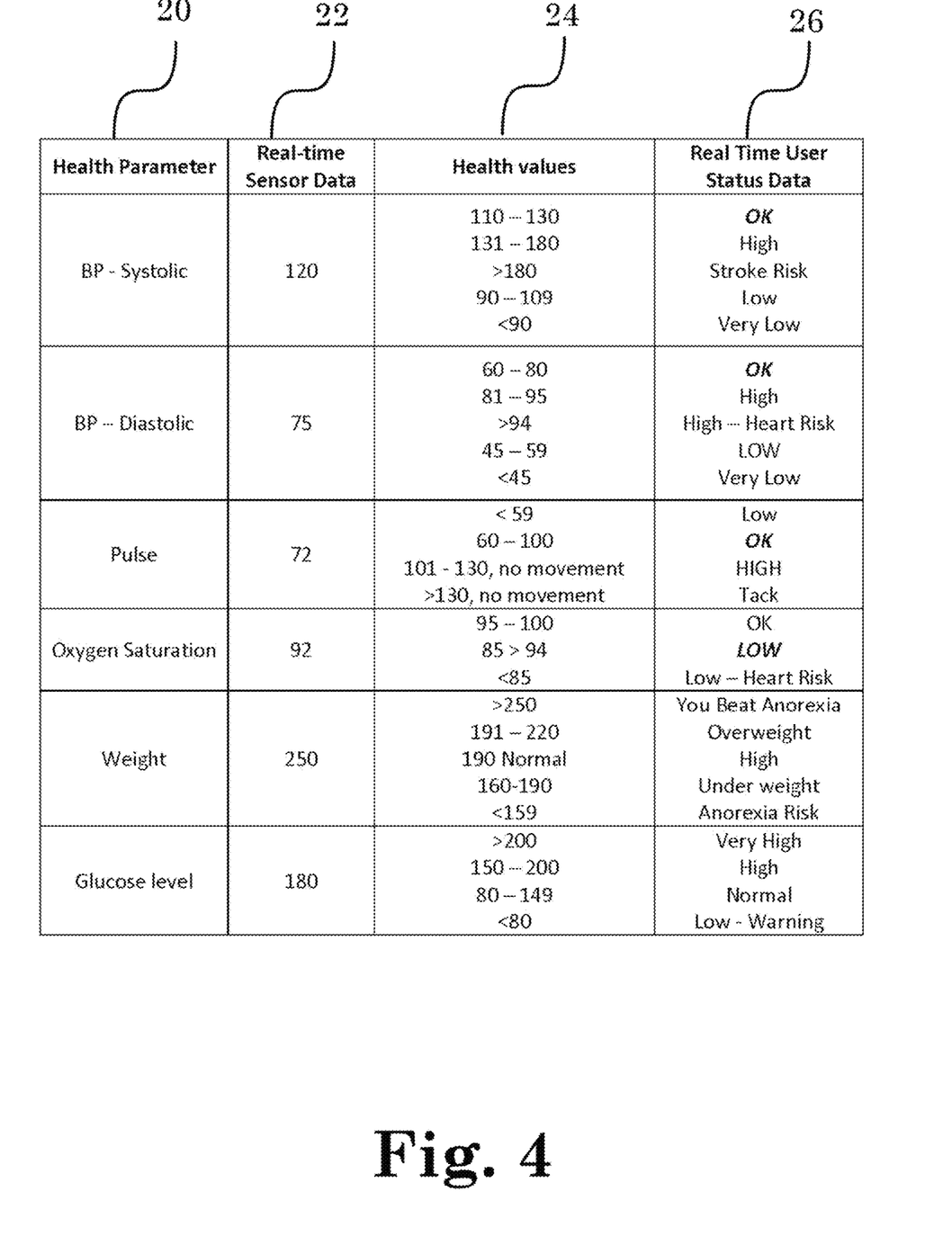
FIG. 4 is a table of exemplary wearable apparatus data.

Referring now to FIG. 1, FIG. 2, and FIG. 3, a wearable apparatus 10 for monitoring a user 4 using an armband 6 with wired connections to the user's hand 8 is presented. As best seen in FIG. 3, the wearable apparatus 10 comprises a processing device 12 electrically associated with a memory 14. Memory 14 is at least one of a local onboard processor memory, a local memory connected to the processing device 12, or a remote memory in communication with the processing device 12. At least one communication circuit 16 is electrically associated with the processing device 12 and may be configured to transmit and/or receive communication signals. At least one health sensor 18 is electrically associated with the processing device 12 and may be configured for monitoring one or more health parameters 20 for a user 4 and generate real-time health sensor data 22. The processing device 12 may be configured to use the real-time health sensor data 22 and health-values 24 stored in the memory 14 and generate real-time user health status data 26. Using the communication circuits 16, the processing device 12 may transmit user health data 28 comprising at least part of the real-time user health status data 26. A verification tag 30 may be associated with the transmitted signal.

An exemplary user health data 28 string includes: Protocol—VT dddd—RTUHSD dddddd; Where VT=verification tag, RTUHSD=the real-time health sensor data.

The verification tag 30 may be used by a remote device 32 to access a data source 34 remote from the wearable apparatus 10 to authenticate the wearable apparatus 10 is an approved device. For example, the data source 34 may require the wearable apparatus 10 to be calibrated and/or certified via periodic inspections. The verification tag 30 would allow an entity using a remote device 34 to have higher confidence in the accuracy of the associated user health data 28 received from a wearable apparatus 10. Examples of a verification tag 30 could be the serial number of the wearable apparatus 10 that can be used to look up information about the wearable apparatus 10 and/or its user 4.

The wearable apparatus 10 may further comprise a signaling element 36 electrically associated with the processor and configured to generate at least one of a sound-based signal or visual-based signal indicating the user's current health status. Ideally, this feature could be selectively turned on and off by a remote device with the appropriate security credentials. Thus, as one enters a building, for example, a security officer may activate the signaling element 36, or a signal may be automatically generated to activate the signaling element 36. As crowds of people walk through a security checkpoint, such may help identify a user in such a crowd whose health status does not meet the requirements for entry into the building. Further, a person meeting for a date or meeting another person for the first time (perhaps in a bar) may wish to define a minimum health status for a relationship or a conversation and be warned when a potential date does not meet the minimum standards. Of course, some of these types of verification activities would be voluntary, and some would not be voluntary.

The user health data 28 may comprise any number of data types, including historical user health data. The historical user health data may include statistics and statistical analysis for past health data values. The historical user health data may include information about infectious diseases the user may have been diagnosed with or currently believed to be a high risk for having based on the real-time user health status data 26. When the real-time user health status data 26 indicates the user has a medical emergency (or is about to have a medical emergency), the wearable apparatus 10 may transmit the user health data 28 and any available location data to an emergency medical service provider. The user's current medication data, comprising a list of the medications a user 4 is currently taking, may be stored in a memory 14 and included in the communications with the emergency medical service provider.

The wearable apparatus 10 may further comprise at least one imaging element 38 electrically associated with the processing device 12 that is at least one of integral to the wearable device 10 or external to the wearable device 10. For the current configuration, the processing device 12 may be further configured to use the imaging element 38 to automatically detect an organism in a user's environment and capture at least one organism image. For this document, an organism may be any living thing, including animals and plants. For this document, animals include warm-blooded animals, cold-blooded animals, birds, insects, viruses, and living things that are generally not considered plants. The processing device 12 may be configured to compare the at least one organism image to sample organism images stored in the memory 14 and generate an organism warning based on the comparison results. Exemplary organism warnings include poisonous snake, poisonous spider, poisonous plant, bee swarm, dangerous animal, rabid animal, sick person, and dangerous person. Example sample organism images would be images of the organism of interest, perhaps exhibiting a sickness. A dangerous person may be identified using facial recognition software to obtain a possible match in a criminal database. The same or similar software can compare the organism data with a database of sample data to obtain a match, thereby identifying the organism and its characteristics that make it dangerous.

The processing device 12 may further be configured to use said at least one imaging element to detect a real-time user movement data and compare the real-time user movement data to sample user movement data stored in the memory 14. For this feature, the processing device 12 may be configured to detect when a user coughs or sneezes. The device may then use said at least one communication circuit to generate and transmit a relatively low power signal warning nearby users using remote devices to consider leaving the area.

For embodiments comprising a location-sensor 40 electrically associated with the processing device 12, the processing device 12 may be configured to use the location-sensor 40 to determine real-time location-data for the wearable apparatus 10, and may include such location-data with any or all signals transmitted to remote devices. Further, processing device 12 may be configured to compare the real-time location-data with stored location-data stored in memory 14 and generate a location warning based, at least in part, on the results of the comparison. For example, the user may be on the verge of entering an area with a high infection rate for an infectious disease. Similarly, a user may be on the verge of entering a high crime rate area. The processing device 12 would ideally be configured to issue a warning to identify the particular threat for the area of interest. The processing device 12 may be further configured to suggest the best navigational route through the area and suggest a possible countermeasure for the threat. For example, the user may be advised to use a mask. For one embodiment, user weapons-data may be stored in memory 14 comprising any weapons a wearable apparatus 10 user is carrying. The processing device 12 may use the location-data to determine the relevant weapons laws for the area of interest and notify the user of the results of the search and make suggestions as to the user's current legal status concerning the weapons-data and generate weapons warnings. Weapons warnings include concealed carry not allowed, guns not allowed without a license, concealed switchblades not allowed. The processing device 12 may be configured to use the at least one communication circuit to receive law enforcement transmissions and determine the data source's location using the transmitted data or signal triangulation. Signal triangulation algorithms are well known in the art. The processing device 12 may then be configured to transmit a weapons-data signal comprising at least part of the user weapons-data to a nearby law enforcement officer so that the law enforcement officer is on notice of a weapon in his/her vicinity.

For one alternative embodiment, the wearable apparatus 10 for monitoring a user comprising a processing device 12 electrically associated with a memory 14 as before. At least one communication circuit 16 and at least one health sensor 18 may be electrically associated with the processing device 12. The at least one health sensor 18 may be configured for monitoring at least one health parameter 20 for a user and generate real-time health sensor data 22. Historical data and health values 24 data may also be stored in the memory 14. As before, a verification tag 30 may be associated with the various user data.

As before, the processing device 12 may be configured to use the real-time health sensor data 22 and the health-values 24 to generate real-time user health status data 26. The processing device 12 may be further configured to generate user health data 28 comprising at least one of (a) at least part of said real-time user health status data 26 or (b) at least part of said historical user health data. A verification tag 30 may also be associated with the user health data 28. The processing device 12 may be further configured to use the at least one communication circuit 16 to transmit the user health data to a remote device. As before, the wearable apparatus 10 may further comprise a signaling element 36 configured to generate at least one of a sound-based signal or a visual-based signal indicating the user's health status.

For this embodiment, the wearable apparatus 10 may further include at least one acceleration sensor 42 electrically associated with the processing device and configured to generate wearable apparatus acceleration data representing a user movement. Further, at least one imaging element 38 may be electrically associated with the processing device 12 that is at least one of integral to the wearable apparatus 10 or external to the wearable apparatus 10. The processing device 12 may be configured to use the imaging element to detect real-time user movement data. The processing device 12 is further configured to use at least part of the real-time user movement data and at least part of the acceleration data and compare such data to sample user disease symptom movement data stored in the memory 14 and update the user health data based on the comparison.

For example, sample user disease symptom movement data may include a digital representation of body movements expected when a person coughs or sneezes. The processing device 12 may use the real-time user movement data and the acceleration data (where such data comprises a digital representation of the detected movement) to determine when such measured data matches the stored digital representation data and update the user health data 28 accordingly.

The wearable apparatus 10 is further configured to be associated with and control a plurality of health sensors or be in communication with and capable of controlling a plurality of health sensor modules associated with a user. Such health sensors include blood pressure sensors, pulse rate sensors, blood glucose level sensors, oxygen saturation sensors, weight sensors, and body temperature sensors.

The wearable apparatus 10 may include interfaces such as a display 46 for presenting system data to a user.

Wearable Apparatus Hardware

Referring now to FIG. 1, FIG. 2, and FIG. 3, pictorial and block diagram representations of the various electronic components of wearable apparatus 10 are presented. Initially, it should be appreciated that figures present just one of a plurality of methods of electrically associating the various electronic components to achieve the features desired. For example, FIG. 3 presents the use of a common buss 48 for electrically associating the various components. It should be appreciated that embodiments where certain devices are electrically associated with each other without the use of a buss fall within the scope of the invention.

The functional blocks of FIG. 3 represent components well known in the art for processing device 12, such as ASSPs (Application Specific Standard Product), Complex Programmable Logic Devices (CPLD), ASICs (application specific integrated circuit), microprocessors, or PICs. In addition, one or more functional blocks may be integrated into a single device or chipsets such as ASSP chipsets. For example, one or more of the various interfaces described below may be integrated into (or have its described functions performed by) processing device 12.

There are many manufactures of suitable ASSP devices including Motorola, and Texas Instruments. While most of the functions are preferably performed by ASSP chip sets, Complex Programmable Logic Devices (CPLD) may be used to interface the various ASSP blocks to system buss (202) allowing one system component to interface with another component. Manufactures of suitable CPLD devices include Lattice's (ispMACH 4000 family) and (Altera's MAX 7000-series CPLD).

The processing device 12 may be configured for controlling almost any item detected in a users environment where control data is known or can be retrieved from a local or remote memory 14. Processing device 12 may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device 12 may comprise onboard FLASH, ROM, RAM, EPROM type memories. Such devices and their electrical connections/associations are well known in the art.

Processing device 12 may be electrically associated with a buss 48. Buss 48 may be a typical prior art communication bus configured for providing a communication path between the various electronic devices electrically associated with buss 48. The buss 48 may comprises electrical signal paths and power paths for transferring power between main power 50 and other electronic devices electrically associated with the buss 48.

Memory 14 may be any type of memory suitable for storing data such as flash memory, SRAM memory, hard drive memory, as well as other types of memories. Volatile memory continuously connected to a power source may be used as a non-preferred method of achieving a nonvolatile memory function, and thus, can be considered a type of nonvolatile memory. Memory 14 may be onboard memory for processing device 12 or offboard memory as well as remote memory accessed over a network (e.g., cloud memory). Memory 14 may be used for storing all types of data including application programs, image data, sound data, customer information, sensor data, health parameters, real-time sensor data 22, health values 24, real-time user health status data 26, user health data 28, and verification tag 30 information.

DSP/ASSP 52 may electrically associated to processing device 12 and may be configured to perform signal processing tasks such as voice, audio, video, encoding, decoding as well as other data and signal processing functions including data comparasions. DSP/ASSP technologies are well known in the art and a detailed description thereof is not necessary to provide an enabling description of the present invention.

Display 46 may configured for displaying the various system data received or generated by wearable apparatus 10. Display 46 may be electrically associated with buss 48 and may include technology for providing a customizable touch screen controller configured for control and decoding functions for display 46. Any suitable display technology for wearable technology and such technologies are well known in the art. The wearable apparatus 10 may further comprise a graphics accelerator that provides support for megapixel cameras and 3D graphics applications. One suitable graphics accelerator are manufactured by various manufacturers including MediaQ.

As noted above, at least one acceleration sensor 42 may be electrically associated with the processing device 12. Such sensors may be associated with the wearable apparatus 10 or a wearable apparatus 10 user body part. The accelerometer generates user acceleration data (user movement data) that is transferred to the processing device 12 which is configured to generate control signals based on user movements.

Referring to FIG. 1, the wearable apparatus 10 is associated with the hand 8 of user 4 using wired technology and switches 9. The wearable apparatus 10 depicted in FIG. 2 has replaced the wired technology with laser-sensor 56 to define a virtual glove.

Exemplary communication circuitries 16 are now considered. It should be appreciated that the wearable apparatus 10 may comprise a plurality of communication circuits 16 comprising transmitters, receivers, and associated technology to generate and communicate with a plurality of devices. Relatively long-range wireless communication circuitry may be sued and RF transceivers electrically associated with antenna. RF Transceiver may be configured to transmit and receive data signals to/from a remote electronic device. It should be noted that embodiments where such communication circuitry 16 comprises only a transmitter or only a receiver fall within the scope of the invention. The at least one transmitter circuits 16 may include a relatively low power transmitter that transmits a data signal in an unlicensed frequency band. Other embodiments include a relatively longer-range transmitter comprising any number of well-known technologies for wireless communications transmitting at any legal power level. For example, the at least one communication circuits 16 may include GPRS, GSM, GPRS, 3G, and EDGE enabled networks as well as WAP networks.

Low Power communication circuits 16 would typically comprise a low power consumption technologies compared to the high power circuits defined above. Such low power communication circuits 16 operates in an unlicensed band, although frequencies requiring a license may be used. Suitable technologies include Bluetooth and ZigBee (IEEE 802.15). ZigBee is a low data rate solution for multi-month to multi-year battery life applications. ZigBee operates on an unlicensed, international frequency band. Such technologies are known and understood by those skilled in the art, and a detailed explanation thereof is not necessary for purposes of describing the method and system according to the present invention.

Figure 5:
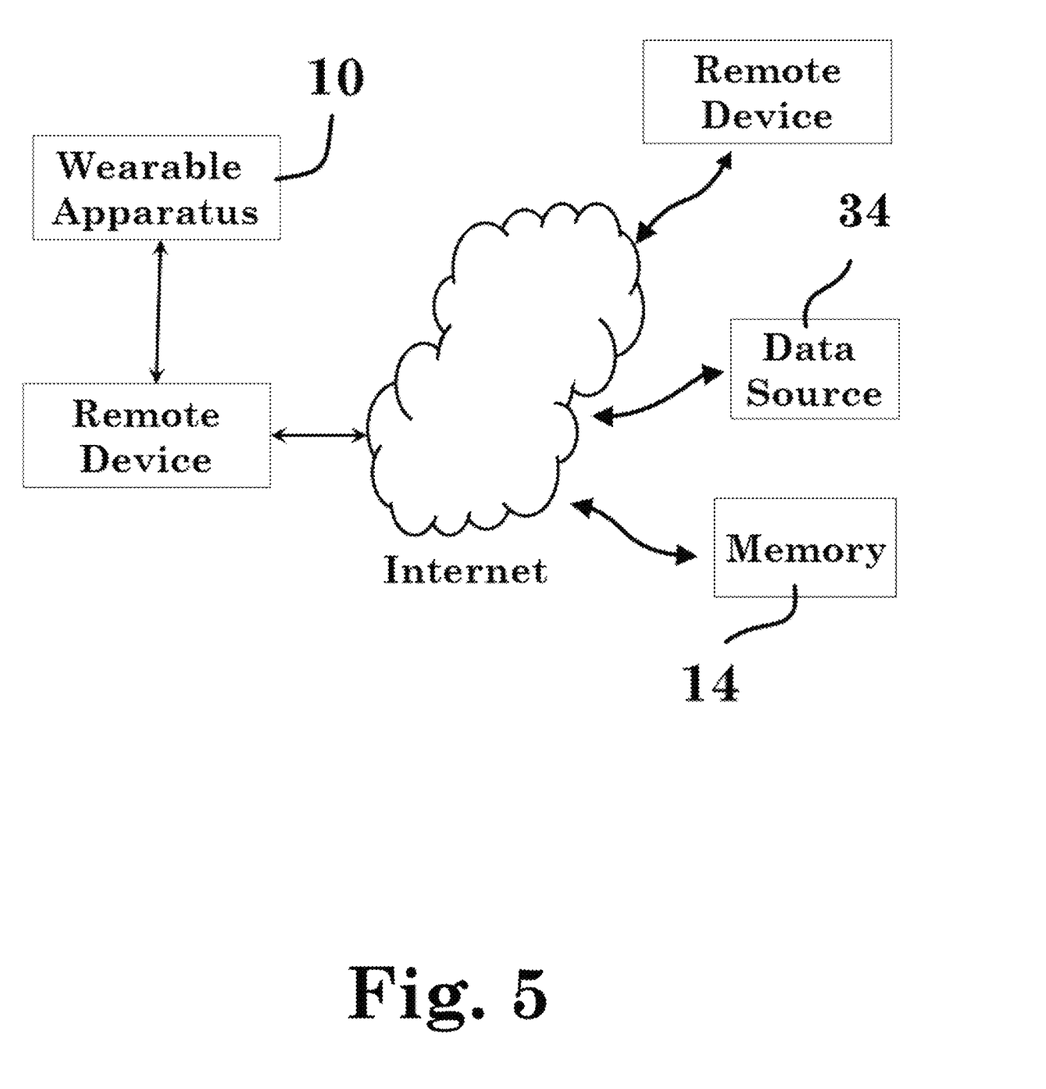
FIG. 5 is a block diagram representing a networked wearable apparatus in communication with remote devices and data sources.

To facilitate remote access to wearable apparatus 10 and the user data associated with wearable apparatus 10, a networking system, such as a local area network (LAN) or a wide area network (WAN) may be utilized. In this presently preferred embodiment, processing device 12 and memory 14 are configured to form a TCP/IP protocol suite and an HTTP (HyperText Transfer Protocol) server to provide two-way access to the various user health data. Such TCP/IP protocols and HTTP server technology are well known in the art. Such allows the wearable apparatus 10 data to be displayed in a webpage configuration.

The wearable apparatus 12 may further be configured for storing and/or generating location data. For embodiments that generate location data, the wearable apparatus 10 includes a location sensor 40, such as a Global Positioning System (GPS) electrically associated with the processing device 12 via buss 48.

The attributes of exemplary main power 50 are now considered. For the presently preferred embodiment, main power 50 is a long life depletable power source such as a Li-Ion battery. For such embodiment, main power 50 comprises at least one long-life rechargeable Li-Ion battery, such as the ones manufactured by A123 Systems®. Alternative embodiments include rechargeable batteries that may be recharged through a direct or inductive connection.

An imaging element 38 may be electrically associated with the processing device 12. The imaging element 38 may be configured for acquiring and transferring images to the processing device 12. The imaging interface 38 may be configured to support CMOS image input sensors such as the one manufactured by Micron® and/or CCD (charge-coupled device) image input sensors such as the ones manufactured by ATMEL® sensors.

Attention now is directed to signaling element 36. For one embodiment, the signaling element 36 comprises a sound transducer and microphone electrically associated with the audio codex. Signaling element 36 may be configured for detecting sound waves and converting such waves into digital data of a predefined format such as MP3. Sound waves may also be generated by the signaling element 36 using the sound transducer to issue warnings and provide for other forms of communications. Signaling element 36 may further include components for generating a visual signal, such as a flashing light.

One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly.

The various computer systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or another type of language or combinations of languages may be used to implement the teachings contained herein. However, software need not be used exclusively, or at all. For example, some embodiments of the systems and methods set forth herein may also be implemented by hardwired logic or other circuitry, including, but not limited to application-specific circuits. Of course, combinations of computer-executed software and hardwired logic or other circuitry may be suitable, as well.

Embodiments of the systems and methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally, or alternatively, the computing device(s) may comprise circuitry that renders the device(s) operative to implement one or more of the methods of the present subject matter. Furthermore, components of the presently disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A wearable apparatus for monitoring a user, said wearable apparatus comprising:
    a processing device;
    a memory electrically associated with said processing device;
    at least one communication circuit electrically associated with said processing device;
    at least one health sensor electrically associated with the said processing device and configured for monitoring a health parameter for a user and generating real-time health sensor data;
    a location-sensor and wherein said processing device is configured to use said location-sensor to determine real-time location-data for the wearable apparatus and compare said real-time location-data with stored location-data stored in said memory and generate a location warning based, at least in part, on the results of the comparison
    at least one imaging element electrically associated with said processing device that is at least one of integral to said wearable device or external to said wearable device, wherein said processing device is configured to use said imaging element to automatically detect an organism in a user's environment and capture at least one organism image, and wherein said processing device is further configured to compare the at least one organism image to sample organism images stored in said memory and generate an organism warning based on the comparison results;
    a verification tag for authenticating the real-time health sensor data;
    wherein said processing device is configured to use said real-time health sensor data and health-values stored in said memory to generate user real-time health status data;
    user weapons-data is stored in said memory identifying weapons a wearable apparatus user is carrying and wherein said processing device is configured to communicate with a remote legal data source and use the real-time location-data to determine the laws related to weapons for the current location and generate a weapons warning; and
    wherein said processing device is configured to use said at least one communication circuit to transmit user health data comprising at least part of said real-time user health status data and said verification tag to a remote device.

2. A wearable apparatus for monitoring a user as in claim 1, wherein said verification tag is used by a remote device to verify the wearable apparatus is certified to send data to the remote device.

3. A wearable apparatus for monitoring a user as in claim 1, wherein said user health data further comprises an infectious disease warning.

4. A wearable apparatus for monitoring a user as in claim 3, wherein said user health data is transmitted to an emergency medical service provider when the user health data predicts a currently non-existing medical emergency.

5. A wearable apparatus for monitoring a user as in claim 4, wherein user medication data is stored in said memory and wherein said user medication data is transmitted to the emergency medical service provider.

6. A wearable apparatus for monitoring a user as in claim 1, wherein said processing device is configured to use said at least one imaging element to detect a real-time user movement data and compare the real-time user movement data to sample user movement data stored in said memory and use said at least one communication circuit to generate and transmit a control signal based on the results of the comparison.

7. A wearable apparatus for monitoring a user as in claim 1, wherein said organism warning comprises an infectious disease warning.

8. A wearable apparatus for monitoring a user as in claim 1, wherein said organism warning is a poisonous plant warning.

9. A wearable apparatus for monitoring a user as in claim 1, wherein said organism warning is a rabid animal warning.

10. A wearable apparatus for monitoring a user as in claim 1, wherein said processing device is configured to use at least part of the real-time location-data and the stored location-data to provide the user with a suggested navigational route.

11. A wearable apparatus for monitoring a user as in claim 1, wherein said processing device is configured to use at least part of the real-time location-data and the stored location-data to determine location threat data and provide the user with a suggested countermeasure.

12. A wearable apparatus for monitoring a user as in claim 1, wherein said processing device is configured to use said at least one communication circuit to receive law enforcement transmissions and determine or receive law enforcement location data and transmit a weapons-data signal comprising at least part of the user weapons-data.

\* \* \* \* \*